United States Patent
Neary et al.

(10) Patent No.: US 7,293,200 B2
(45) Date of Patent: Nov. 6, 2007

(54) METHOD AND SYSTEM FOR PROVIDING TRANSPARENT INCREMENTAL AND MULTIPROCESS CHECKPOINTING TO COMPUTER APPLICATIONS

(75) Inventors: Michael Oliver Neary, Menlo Park, CA (US); Ashwani Wason, San Jose, CA (US); Shvetima Gulati, San Jose, CA (US); Fabrice Ferval, Seattle, WA (US)

(73) Assignee: Availigent, Inc., San Jose, CA (US)

( * ) Notice: Subject to any disclaimer, the term of this patent is extended or adjusted under 35 U.S.C. 154(b) by 15 days.

(21) Appl. No.: 11/213,630

(22) Filed: Aug. 26, 2005

(65) Prior Publication Data
US 2006/0085679 A1   Apr. 20, 2006

Related U.S. Application Data

(60) Provisional application No. 60/605,026, filed on Aug. 26, 2004.

(51) Int. Cl.
*G06F 11/00* (2006.01)
(52) U.S. Cl. .............. 714/35; 714/6; 714/11; 714/13; 714/15; 714/38
(58) Field of Classification Search .............. 714/6, 714/11, 13, 15, 38
See application file for complete search history.

(56) References Cited

U.S. PATENT DOCUMENTS 6,154,877 A * 11/2000 Ramkumar et al. ......... 717/114
6,161,219 A * 12/2000 Ramkumar et al. ......... 717/130
6,718,538 B1 * 4/2004 Mathiske ...................... 717/129
2005/0050304 A1 * 3/2005 Mukherjee et al. ......... 712/218
2005/0251785 A1 * 11/2005 Vertes et al. ................. 717/105

OTHER PUBLICATIONS

Hyochang Nam, Probabilistic Checkpointing, Jul. 2002, IEICE Trans. INF & SYST., vol. E85-D, pp. 1-12.*
Jose Carlos Sancho, On the Feasibility of Incremental Checkpointing for Scientific Computing, Apr. 2004, IEEE, Proceedings of the 18th International Parallel and Distributed Processing Symposium, pp. 1-9.*

* cited by examiner

*Primary Examiner*—Robert W. Beausoliel
*Assistant Examiner*—Charles Ehne
(74) *Attorney, Agent, or Firm*—John P. O'Banion

(57) ABSTRACT

Incremental single and multiprocess checkpointing and restoration is described, which is transparent in that the application program need not be modified, re-compiled, or re-linked to gain the benefits of the invention. The processes subject to checkpointing can be either single or multi-threaded. The method includes incremental page-boundary checkpointing, as well as storage checkpointing of data files associated with applications to ensure correct restoration without the need to restore files for other application programs. Incremental and full checkpoints are asynchronously merged to ensure proper operation while reducing checkpointing delay. By way of example a user-level programming library is described for loading into the address space of the application in conjunction with a loadable kernel module (LKM) or device driver used to capture and restore process state on behalf of the application. These techniques are particularly well suited for use with high-availability (HA) protection programming.

71 Claims, 8 Drawing Sheets

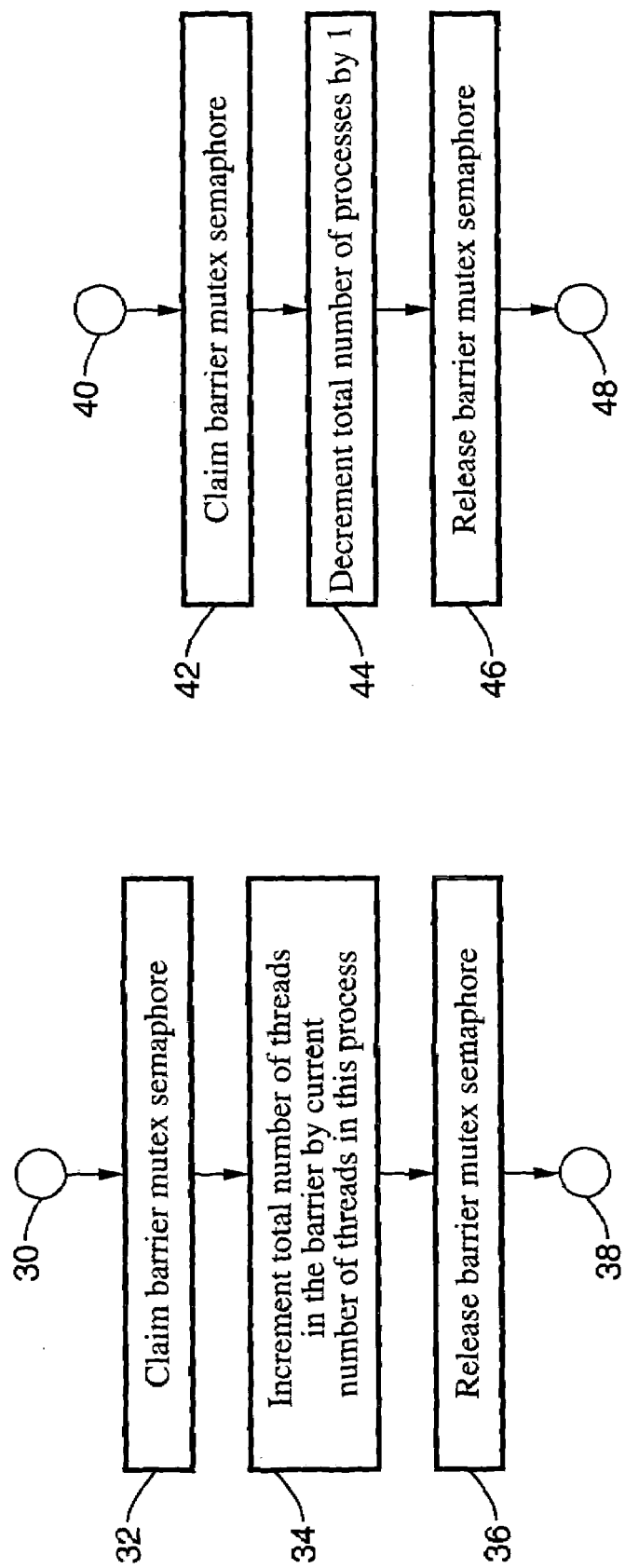

METHOD AND SYSTEM FOR PROVIDING TRANSPARENT INCREMENTAL AND MULTIPROCESS CHECKPOINTING TO COMPUTER APPLICATIONS

CROSS-REFERENCE TO RELATED APPLICATIONS

This application claims priority from U.S. provisional patent application Ser. No. 60/605,026 filed on Aug. 26, 2004, incorporated herein by reference in its entirety.

STATEMENT REGARDING FEDERALLY SPONSORED RESEARCH OR DEVELOPMENT

Not Applicable

Incorpotation-by-Reference of Material Submitted on a Compact Disc

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to enterprise computer systems, embedded computer systems, and computer systems in general, and more particularly to transparent multiprocess checkpointing and automatic restoration for computer applications.

2. Description of Related Art

In a number of settings high availability service for complex computer applications is a necessary and nonnegotiable requirement. For example, high availability scenarios include the case of Internet and corporate data centers, financial services, telecommunications, government systems and medical systems.

Providing high availability service generally requires that in the case that an application executing on a first server encounters a failure, for any of a number of reasons, application execution continues automatically on a second server that continues to interact with the client system in response to execution of a failover process. The effort involved in achieving such availability and reliability can be one of the most expensive and time-consuming aspects of application development and can even result in delays in deploying an application.

Therefore, there is a need for methods, systems and procedures for achieving high availability and reliability through a cost-effective, easy-to-use software infrastructure, rather than through prolonged custom coding, lengthy development time and substantial expenditure.

Checkpointing is an integral part of high availability which provides for the capture of the complete state of an application process (i.e., periodically), including, but not limited to, its memory pages, stack contents, open files, sockets, pipes, and other state information that is for instance retained in the kernel on behalf of the process. Later on, the application can be restored in the same state as it was when the checkpoint was taken, even when the restoration is performed on a different computer system.

Traditionally, the problem of saving the state of an application has been approached from within the application, taking advantage of its full knowledge of application internals, data structures, and semantics. However, this approach is highly intrusive, since the application code itself needs to be modified to operate in the desired high availability manner.

Accordingly, checkpointing has been used in various varieties over the years, and more recently, lower level transparent checkpointing has been described using checkpointing software forming a layer between the application and the operating system. For example, William R. Dieter and James E. Lumpp, "User-level Checkpointing for LinuxThreads Programs", In *Proceedings of the FREENIX Track:* 2001 *USENIX Annual Technical Conference*, pp. 81-92, June 2001, incorporated herein by reference in its entirety, describe a user-level checkpointing library for single-process multi-threaded applications.

However, these checkpointing mechanisms are not amenable for use with high availability services for most applications and suffer from a number of drawbacks. Current forms of checkpointing either require modifications to the application and are thus not transparent, or only work for single-process applications, and do not support transparent incremental checkpointing The present invention overcomes these shortcomings and provides transparent incremental and multiprocess checkpointing based on a user-level library and a loadable kernel module.

BRIEF SUMMARY OF THE INVENTION

The present invention comprises a method and system to transparently checkpoint and restore a computer application program, which may comprise one or more distinct computer processes. Each of these processes may be single-threaded or multi-threaded. Transparency in this context means that the application program need neither be modified in any way, nor be re-compiled or re-linked.

Checkpoints may either be taken as full or incremental checkpoints. In the former case, a single checkpoint is sufficient to restore the whole application, whereas in the latter case, only the differences between two checkpoints are saved and subsequently applied to a previous full checkpoint.

A preferred embodiment of the invention comprises a user-level programming library that can be pre-loaded into the application's address space, plus a loadable kernel module (LKM) that is used to capture and restore the state that is kept in operating system kernel space on behalf of the application.

In various embodiments of the invention, features are provided that are useful for applications that must be highly available, including but not limited to:

(a) Powerful and transparent checkpointing;
(b) Checkpointing of single-threaded and multi-threaded application processes;

(c) Checkpointing of daemonized multi-process applications;
(d) Checkpointing of general multi-process applications; and
(e) Full and incremental checkpointing.

According to an aspect of the invention, a method, system, improvement and/or computer program are described for creating incremental checkpoints; creating full checkpoints; and providing for automatic asynchronous merging of incremental checkpoints with full checkpoints at a checkpoint storage location; wherein at least said incremental checkpointing is implemented in user space; and wherein at least said incremental checkpointing comprises page-boundary memory checkpointing. In one embodiment, file storage checkpointing is provided wherein one or more files for an application program can be restored without requiring restoration of files for other application programs. In another embodiment, barrier synchronization using system semaphores is employed. In another embodiment, checkpointing is implemented using a device driver in lieu of operating system kernel modification. In another mode, the state of waiting queues is captured using kernel-level interception of system calls. In one embodiment, the interception is implemented in a kernel module in a multiprocessing environment. In another embodiment, the interception is implemented without a kernel module in a single processing environment.

In accordance with another aspect of the invention, there is described a checkpointing method, system, improvement and/or computer program for checkpointing memory images of processes and data for restoration of the entire process tree/hierarchy. In one mode, the processes can be multi-threaded. In another mode, the processes can be single-threaded. In one embodiment, one or more portions of the tree/hierarchy are restorable based on priority of application programs or processes. In one embodiment, the checkpointing is implemented using a device driver in lieu of operating system kernel modification. In another mode, the state of waiting queues is captured using kernel-level interception of system calls. In one mode, the interception is implemented in a kernel module in a multiprocessing environment in another mode, the interception is implemented without a kernel module in a single processing environment.

In accordance with another aspect of the invention, there is described a checkpointing method, system, improvement and/or computer program for checkpointing memory images of processes and data for restoration of only the first or second level of the process tree. In one mode, the processes can be multi-threaded. In another mode, the processes can be single threaded. In one embodiment, the checkpointing is implemented using a device driver in lieu of operating system kernel modification. In another mode, the state of waiting queues is captured using kernel-level interception of system calls. In one mode, the interception is implemented in a kernel module in a multiprocessing environment in another mode, the interception is implemented without a kernel module in a single processing environment.

According to another aspect of the invention, a method, system, improvement and/or computer program is provided for checkpointing user-space application memory images and the state that the operating system maintains on behalf of the application. In one embodiment, the checkpointing runs entirely in user space and no modification of the operating system kernel or additional kernel modules is required. In one embodiment, the checkpointing is implanted using a device driver in lieu of operating system kernel modification. In another embodiment, the state of waiting queues is captured using kernel-level interception of system calls. In one mode, the interception can be implemented in a kernel module in a multiprocessing environment. In another mode, the interception can be implemented without a kernel module in a single processing environment.

In the various aspects, embodiments and modes described above, storage checkpointing can be included by providing means for saving N full copies of storage checkpoints; providing a hardlink to a first saved storage checkpoint; and removing the first storage checkpoint when a subsequent storage checkpoint is saved and maintaining the hardlink to the first saved storage checkpoint; wherein a physical copy of said first storage checkpoint is not made when said subsequent storage checkpoint is saved. In one mode, the storage image is synchronized with a memory image at the time a storage checkpoint is saved; wherein each memory checkpoint has a corresponding storage checkpoint. In another mode, the storage image is captured without capturing the memory image of the process.

In addition to the various aspects, embodiments and modes described above, a template can be provided which defines one or more processes to be protected by checkpointing and which provides for selective restoration. In one embodiment, means are provided for defining one or more processes to be protected by checkpointing and provide for selective restoration.

Another aspect of the invention is a method, system, improvement and computer program for achieving transparent integration of an application program with the checkpointing library and an underlying high availability protection program, that transparently and automatically injects startup and registration code (which herein shall be referred to as "et_init( )") into an application program during launch; wherein the checkpoint library gets initialized; wherein said application program automatically registers with said high availability protection program; wherein modification of the application program or application program recompilation is not required; and wherein a custom loader is not required. In one embodiment, unregistration of said application program from said high availability program is monitored and deemed a normal exit.

Embodiments of the present invention can provide a number of beneficial aspects which can be implemented either separately or in any desired combination without departing from the present teachings.

Another aspect of the invention is a method, system, computer program, computer executable program, or improvement wherein storage checkpointing is provided.

Another aspect of the invention is a method, system, computer program, computer executable program, or improvement wherein storage checkpointing synchronized with process checkpointing is provided.

Another aspect of the invention is a method, system, computer program, computer executable program, improvement as recited in any of the preceding claims, wherein profiling of running applications is provided to determine optimal policy settings.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

FIG. 2 is a flow diagram illustrating claiming a mutex construct to add a process to a barrier according to an aspect of the present invention.

FIG. 3 is a flow diagram illustrating releasing a mutex construct to release a process from a barrier according to an aspect of the present invention.

DETAILED DESCRIPTION OF THE INVENTION

Figure 1:
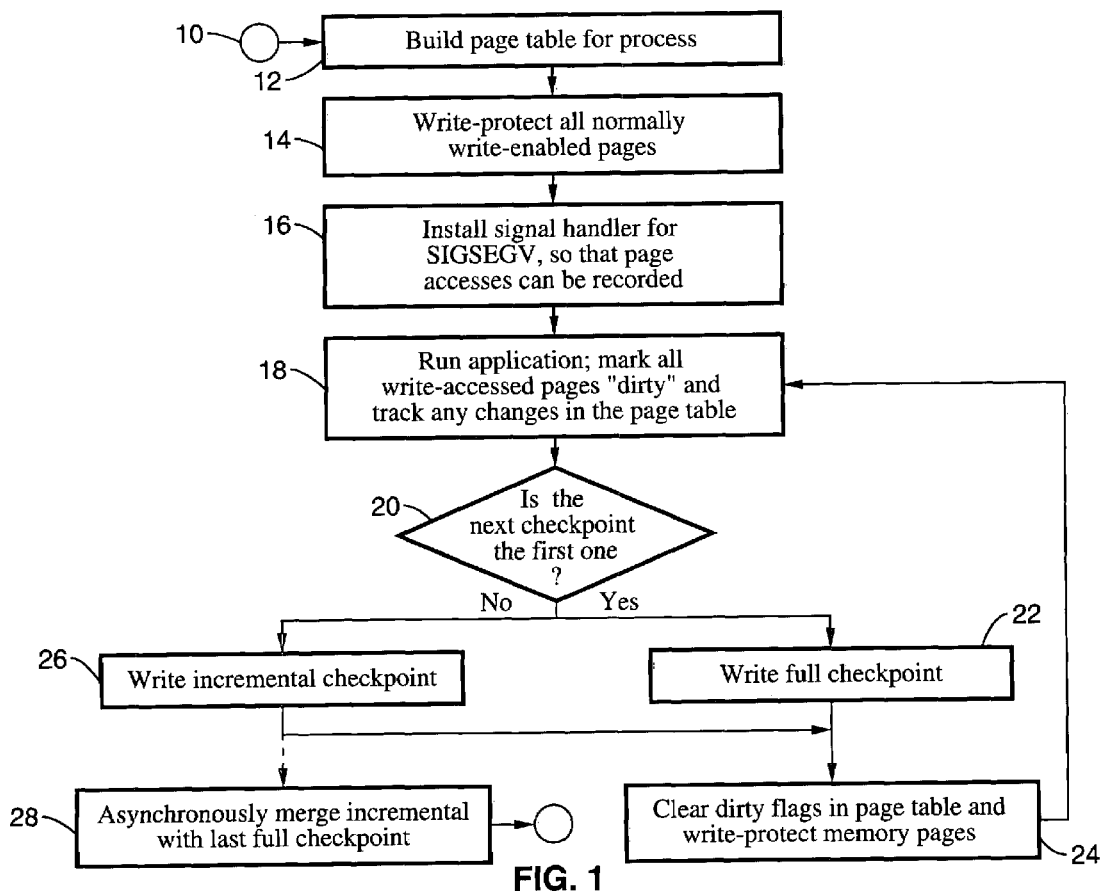
FIG. 1 is a flow diagram illustrating incremental checkpointing according to an embodiment of the present invention, showing maintaining a page table within a checkpointing library and the incremental checkpointing of only those memory pages modified since the last checkpoint.

Referring more specifically to the drawings, for illustrative purposes the present invention will be described in relation to FIG. 1 through FIG. 9. It will be appreciated that the system and apparatus of the invention may vary as to configuration and as to details of the constituent components, and that the method may vary as to the specific steps and sequence, without departing from the basic concepts as disclosed herein.

1. Introduction.

The present invention is based on a single-process, multithreaded checkpointing method with numerous enhancements and improvements upon, such as incremental checkpointing, improved barrier synchronization, multiprocess checkpointing, storage checkpointing, and the use of a loadable kernel module to capture the state the kernel keeps on behalf of application processes.

2. Transparent Preloading Of The Checkpoint Library.

In order to provide checkpointing to an application, the checkpointing software should be loaded into the address space of the application. In addition, the checkpointing services should be initialized at program startup and shut down at program exit. Traditionally, this process has involved adding custom code to the application, therein necessitating compilation and linking. However, in many situations the end user of a program does not even have access to the source code, so that practice is subject to limited applicability.

Therefore, an important aspect of the present invention is transparency, wherein, for example, the application program need not be modified in any way to allow checkpointing. More precisely, the application program need not be changed, and therefore, it need not be recompiled. Moreover, the application executable need not be relinked to include the checkpointing code in its address space. The technique utilized to enable checkpointing and initialize the checkpointing library is called transparent preloading. The method is based on the concept of shared libraries, which are supported by all modern operating systems, e.g., Microsoft Windows, Linux, Apple OS X, and others.

In the present invention, the user-level portion of the checkpointing source code is compiled into a position-independent shared library. This enables either relinking with the application, or more transparently, preloading. By way of example, and not of limitation, the following general sequence of steps illustrates preloading on the Linux operating system in an exemplary embodiment of the invention:

1. Setting the environment variable LD_PRELOAD to the location of the checkpoint library. For example, if the checkpoint library is named "libetchkpt.so", and is located in directory "/home/chkpt/", then set LD_PRELOAD=/home/chkpt/libetchkpt.so. Additional libraries may need to be appended so that the checkpoint library depends to this path.

2. Starting the application in the usual way. The checkpoint library is preloaded, and its initialization routine in "_init( )" is executed before the application executes its "main( )" function. Also in_init( ), the checkpoint library registers an exit handler that gets invoked whenever the application calls the "exit( )" function, permitting a regular shutdown of checkpointing before the program terminates.

3. Interception of any system library calls that the application makes by the checkpoint library if necessary. Examples of such calls are "pthread_create( )", to create a new execution thread, or "mmap( )", to map a new segment of memory. There are numerous additional library calls similar to these that can be intercepted according to the invention. This interception technique allows the checkpoint library to do its bookkeeping and operation transparently.

3. Incremental Checkpointing.

One method of checkpointing a process is to take full checkpoints each time, for example save all currently used memory pages. Another method, incremental checkpointing, is described in the following. In incremental checkpointing, the size of the checkpoint is minimized by saving only those memory pages that were modified since the last checkpoint. These modified pages are also referred to as "dirty" pages.

FIG. 1 illustrates an embodiment of the invention for incremental checkpointing. Execution is shown entering from block 10, and block 12 represents checkpointing library maintaining a page table for all pages currently mapped to the process. Any changes to memory segments and pages are tracked and the table is updated accordingly. Write-protecting segments that are write-accessible for the application is depicted as per block 14 as being performed by the checkpointing library. It should be noted that a SIGSEGV ("segmentation violation") signal will be generated if the process attempts to modify a page in a write-protected segment.

In block 16 the library installs a signal handler for SIGSEGV, which identifies the page that was accessed, looks it up in the page table, and then marks it as "dirty" in block 18. The signal handler then reverts the protection for the page back to the original protection set by the application, so that the write access can be permitted.

In block 20, if it is determined that this is the first checkpoint, the library writes a full checkpoint only once as per block 22, therein forming the basis for subsequent incremental checkpoints. The dirty flags are cleared in the page table as per block 24.

In block 26, when it is determined not to be the first checkpoint, dirty pages are identified via the page table, and written to an incremental checkpoint. After the checkpoint is saved, the dirty flags are cleared and the memory is write-protected again at block 24 before the application threads are released from the checkpoint.

Incremental checkpoints generated in the above manner should be continuously merged with a previous full checkpoint to produce a new valid full checkpoint. Block 28 represents a separate, connected process, so that merging is performed asynchronously in response to the writing of an incremental checkpoint.

By using incremental checkpointing, an application can produce a checkpoint more readily, at the expense of additional processing time for merging checkpoints.

4. Semaphore-Based Barrier Synchronization.

The following is a description of an embodiment of a barrier mechanism according to the invention, which is based on System V (kernel) semaphores and which enables holding multiple processes and all their associated threads in the same barrier. This is an important prerequisite to achieve consistent checkpoints across multiple processes of a single application.

System V semaphores are a synchronization primitive that can be shared across multiple processes. The kernel maintains these semaphores, and provides system calls to create, open, or modify a set of semaphores. These system calls are semget( ), semctl( ), and semop( ). See the Linux manual for further information.

4.1 Barrier Setup.

The information needed for the barrier is stored in a data structure that is accessible to all processes via shared memory. The data structure looks somewhat like this (pseudo-code given in the C programming language):

```
typedef struct {
    int semid;          /* id of semaphore array containing barrier semaphores */
    int num_procs;      /* overall number of processes in the
                           group */
    int waiting_procs;  /* no. of processes that have entered
                           thread info */
    int num_threads;    /* overall number of threads */
    int waiting_threads; /* number of threads waiting at barrier */
} barrier_t;
```

There is an entry for the semaphore identifier obtained via semget( ), an entry for the total number of processes participating in the barrier, an entry for the number of processes waiting at the barrier, and entry for the total number of threads participating in the barrier, and an entry for the number of threads waiting at the barrier.

The inventive barrier structure is mapped into the process memory via the following call:

barrier=mmap(BARRIER_ADDR, sizeof(barrier_t),
  PROT_READ|PROT_WRITE,
  MAP_SHARED|MAP_ANONYMOUS, -1, 0);

The semaphore identifier in the barrier structure refers to an array of kernel semaphores containing:
  one semaphore used as a mutex to synchronize access to the other entries in the barrier structure;
  one semaphore used as a barrier for processes to add their current number of threads, and
  n semaphores used as thread barrier semaphores, with n being the number of barriers required to write a checkpoint (in the current implementation, n=6).

These n+2 semaphores are obtained via the following relation:
  barrier->semid=semget(semkey, N+2, IPC_CREAT|
    S_IRUSR|S_IWUSR);

4.2 Barrier Mechanism.

Now that an example of barrier data structures has been provided, we will now describe various barrier mechanism.

First, referring to FIG. 2, an embodiment of a method for adding a process to a barrier according to the present invention is illustrated. In this example, when a new process starts up, the present invention is generally configured to add the process to the barrier. Execution from entry 30 reaches block 32 representing claiming of the mutex semaphore, followed by incrementing the total number of processes by one in block 34, and block 36 in which releasing the mutex semaphore is represented before exit 38 of this code section.

FIG. 3 illustrates, by way of example, an embodiment of a method for removing a process from the barrier in response to process termination according to the invention. Here, execution from entry 40 reaches block 42 representing claiming of the mutex semaphore, followed by decrementing the total number of processes by one as per block 44, and releasing the mutex semaphore in block 46 is performed before exit 48.

Figure 4:
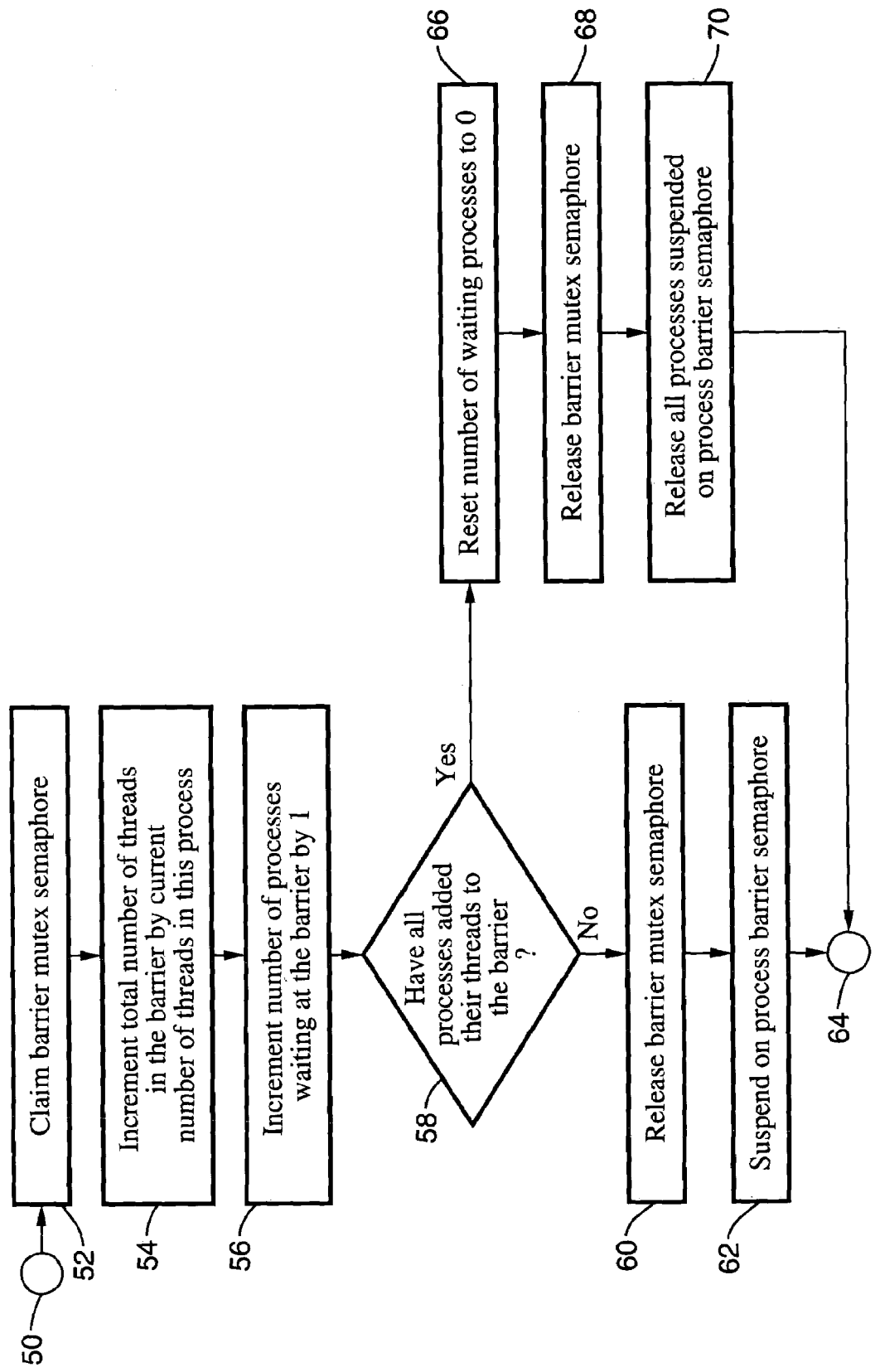
FIG. 4 is a flow diagram illustrating adding threads to a barrier according to an aspect of the present invention.

FIG. 4 illustrates, by way of example, a method according to the invention for incrementing the number of threads of the process in the barrier at the beginning of a checkpoint. Execution from entry 50 reaches block 52 which represents the mutex semaphore being claimed. In block 54 the total number of threads in the barrier is incremented by the current number of its threads. Then the value for the number of processes waiting at the barrier is incremented by one as per block 56. A determination is made at block 58 if all processes have added their threads to the barrier. If all processes have not added their threads to the barrier then mutex semaphores are released as per block 60, and in block 62 a suspend takes place on the process barrier semaphore before exit 64.

However, if all processes have added their threads to the barrier then the number of waiting processes is reset to zero as per block 66, and the mutex semaphores are released at block 68. Finally, all other processes suspended on the process semaphore are released as given by block 70 prior to exit 64.

Figure 5:
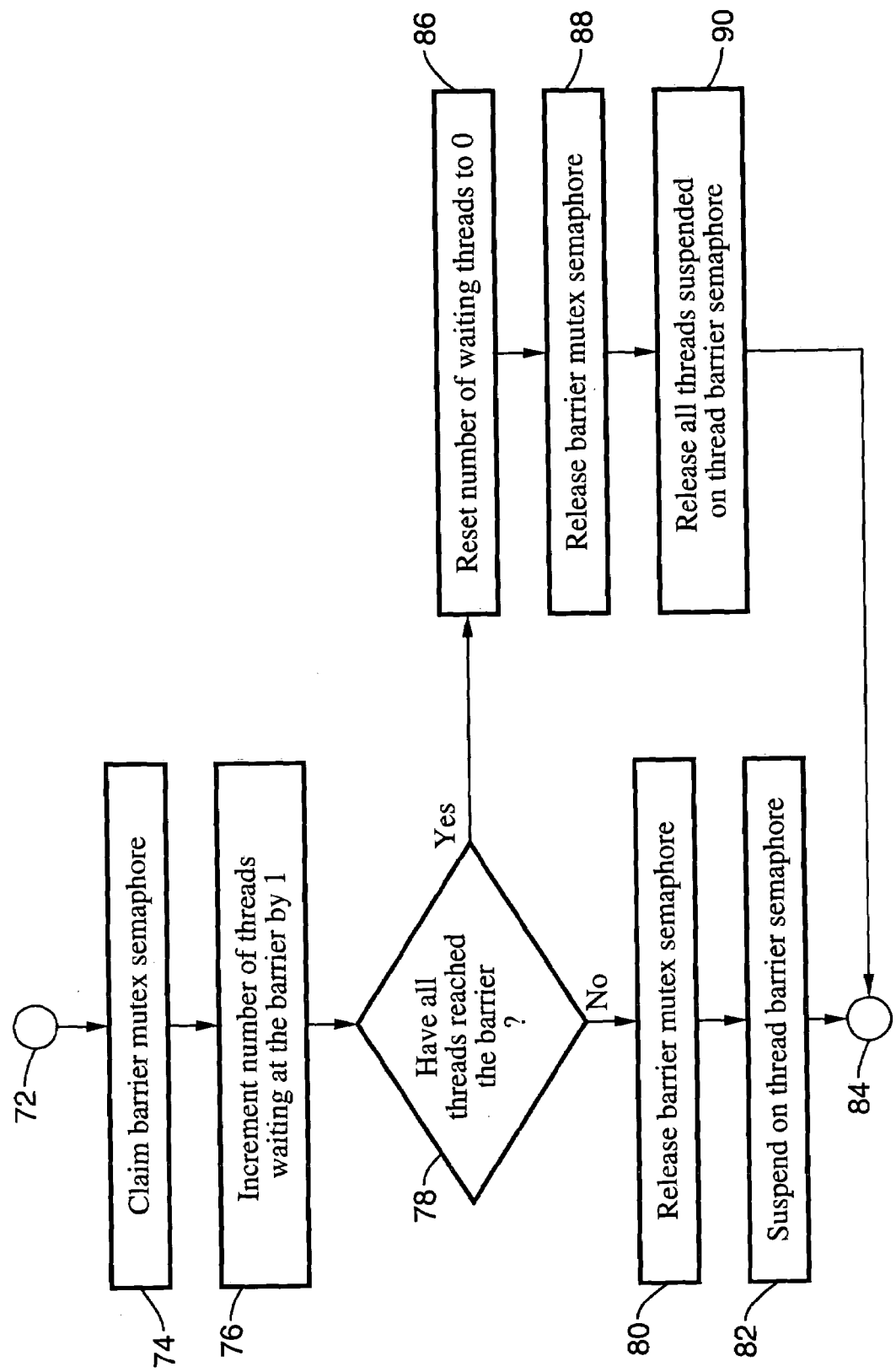
FIG. 5 is a flow diagram illustrating waiting at a thread barrier according to an aspect of the present invention.

FIG. 5 illustrates, by way of example, an embodiment of a method for waiting at a thread barrier according to the invention. In this example, a thread waits at barrier j. Execution from entry 72 reaches block 74 at which the mutex semaphore is claimed. As per block 76 the number of threads waiting at the barrier is incremented by one. A determination is made at block 78 if all threads have reached the barrier. If not all threads have reached this barrier, then as per block 80 the mutex semaphore is released, and thread barrier semaphore j is suspended at block 82 prior to exit 84 of this section.

In the case where all threads have reached the barrier, then the number of waiting threads is reset, such as to zero, in block 86, the mutex semaphore for the barrier is released as per block 88, all other threads suspended on thread semaphore j are released as given by block 90 and this section of code is exited 84.

Figure 6:
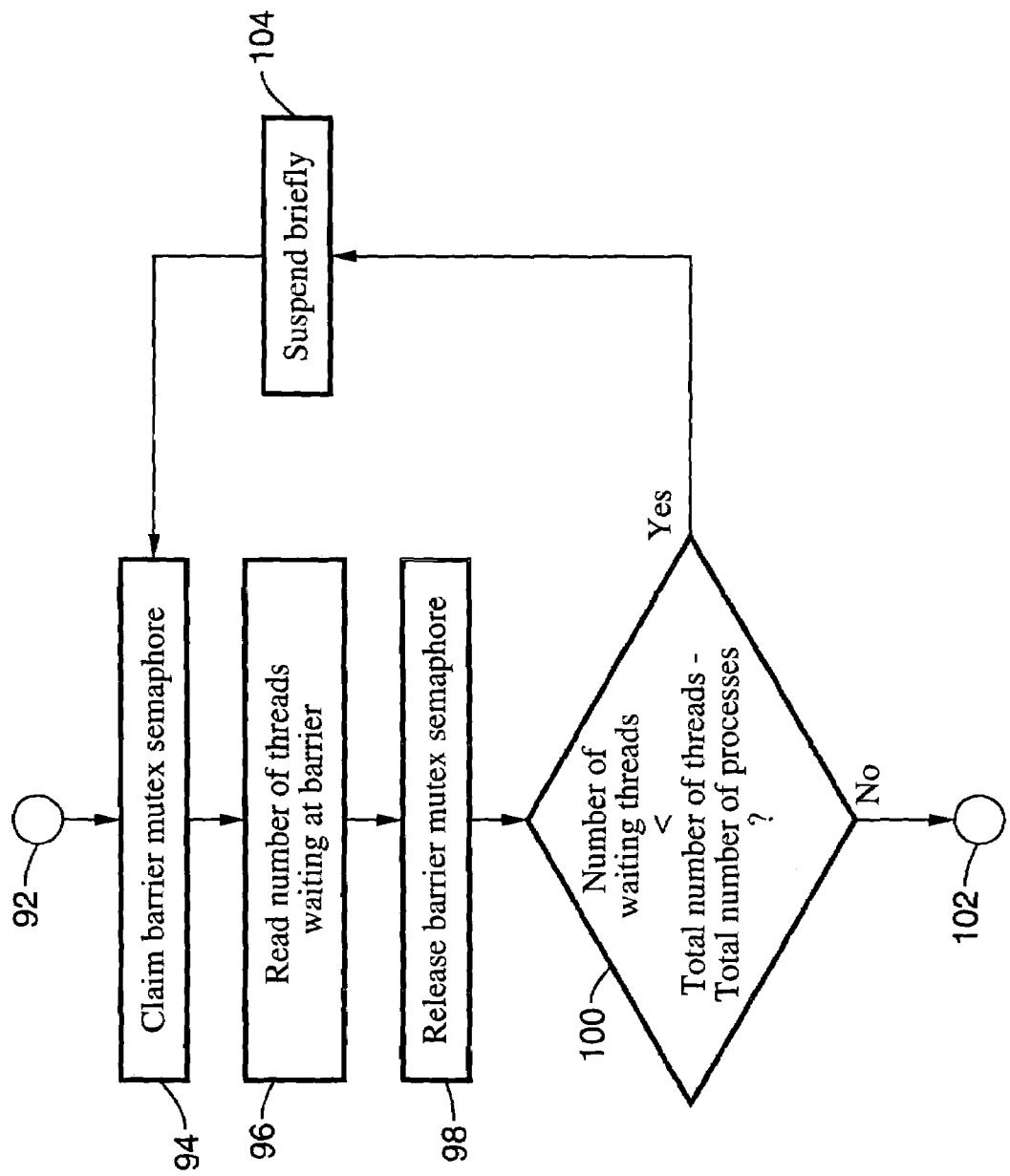
FIG. 6 is a flow diagram illustrating waiting for other threads to reach a barrier according to an aspect of the present invention.

FIG. 6 illustrates, by way of example, an embodiment of a method according to the invention by which a single thread per process can execute another barrier operation. In this example, one thread per process waits for all other threads to reach barrier j by repeatedly executing the process outlined in the figure. After entry 92 the mutex semaphore is claimed at block 94, followed by reading the number of threads waiting at the barrier as per block 96, and releasing the mutex semaphore for the barrier at block 98. A determination is made as per block 100 if the number of waiting threads is less than the total number of threads minus the total number of processes. If determination yields a negative result then this section exits 102, if the number of threads is less than this value then a brief suspension is performed as per block 104 prior to continuing to claim mutexes at block 94.

5. Multiprocess Checkpointing.

The following is an overview of multi-process checkpointing according to an embodiment of the invention. The description assumes familiarity with the concepts of single-process checkpointing as well as the semaphore-based barrier mechanism as would be known to one of ordinary skill in the art.

5.1 Setup.

Figure 7:
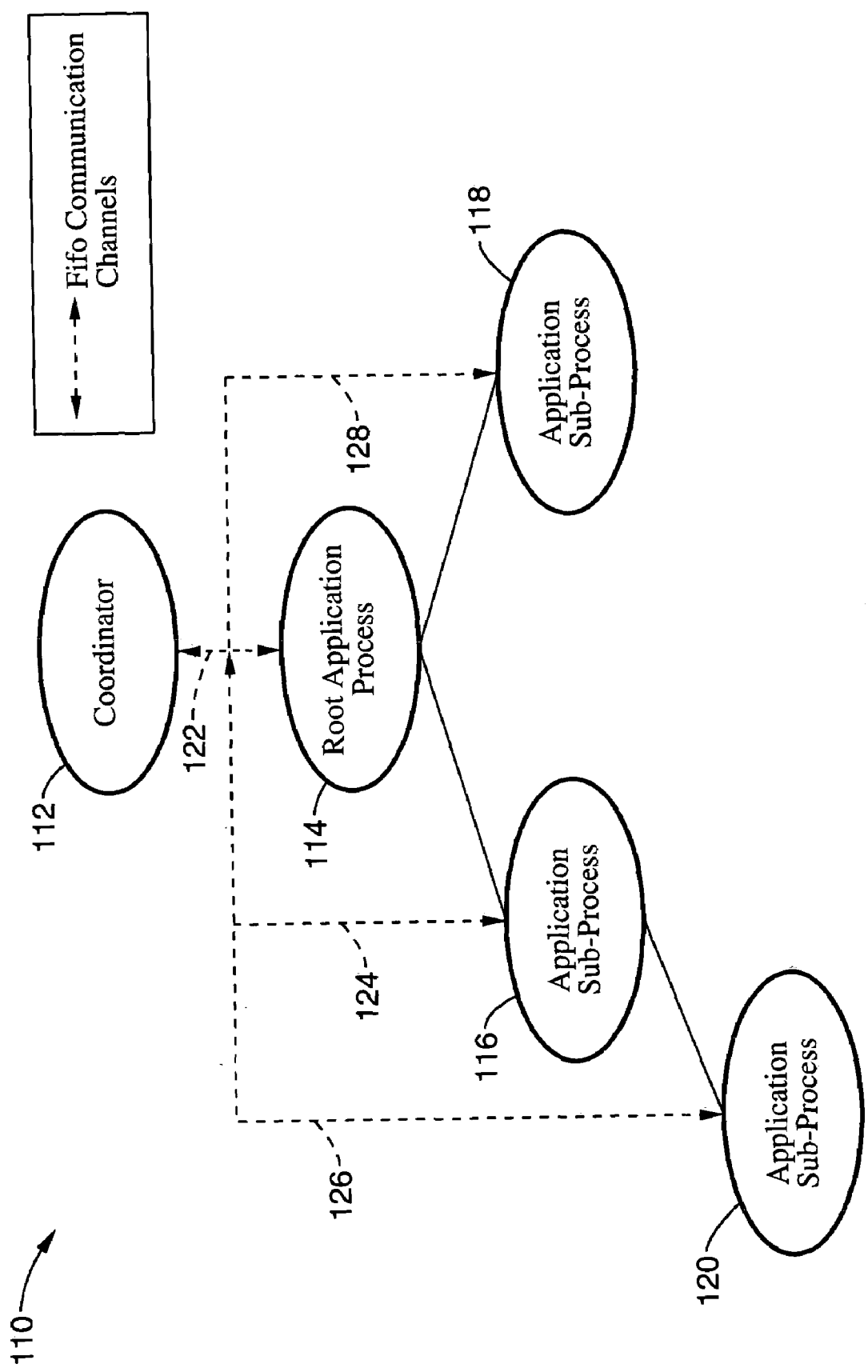
FIG. 7 is a hierarchy diagram illustrating a multi-process checkpointing configuration according to an aspect/embodiment of the present invention.

FIG. 7 illustrates an example embodiment of multiprocess checkpointing setup 110 according to the present invention. In order to control the synchronous checkpointing of multiple processes in an application process tree, a dedicated process referred to herein as a coordinator 112 is placed at the top of each such tree. The root process in every application process tree is coordinator 112, which then forks the top-most root application process 114 from which forks two application sub-processes 116 and 118 then later forks application sub-process 120. After that, the coordinator remains in a server loop waiting for, and processing, messages from application processes.

Each application process connects to the coordinator via two named pipes, for example "FIFOs", 122, 124, 126, and 128. This connection is handled transparently in an interceptor for the fork( ) system call. The coordinator, upon receiving a new process registration, sets up its end of the communication channels and enters the new process information in the process table and the shared barrier structure. The information stored for each process includes its pid, parent pid, and communication FIFO file descriptors. The coordinator itself may also connect to an underlying high-availability system, such as via two FIFOs.

In a manner similar to single-process checkpointing, each process has a checkpoint thread that controls the local single-process checkpoints. In the multi-process case, however, the individual checkpoint threads do not have a timer of their own; instead, they wait for a new signal from the checkpoint thread of the coordinator referred to herein as the "prepare checkpoint" signal. The only checkpoint thread waiting to time out for a new checkpoint is that of the coordinator. Therefore, the checkpoint thread of the coordinator acts as "master", and all other checkpoint threads act as "slaves".

5.2 Taking Multiprocess Checkpoints.

Figure 8:
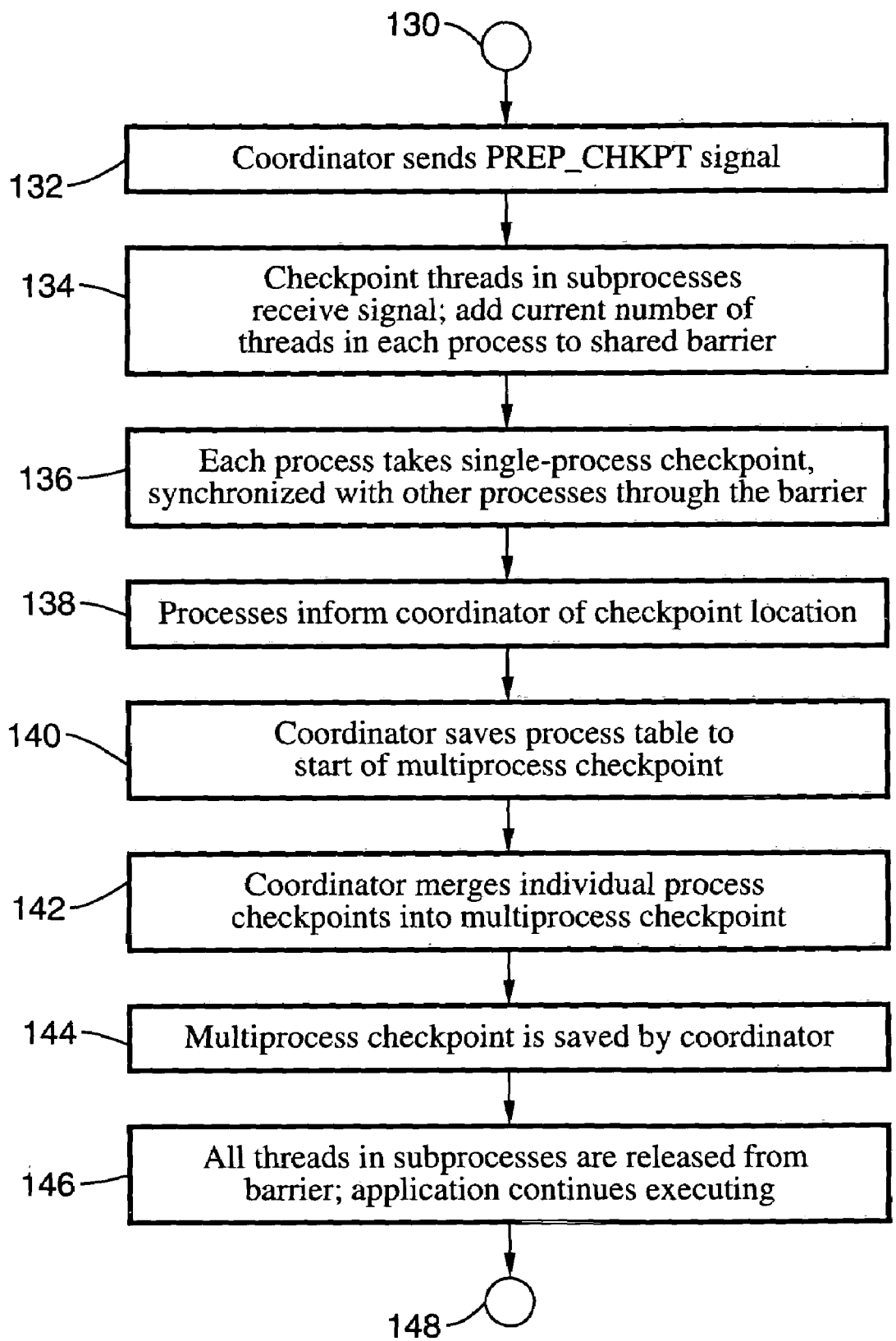
FIG. 8 is a flow diagram illustrating processes taking multiprocess checkpoints according to an aspect/embodiment of the present invention.

FIG. 8 illustrates, by way of example, the taking of multiprocess checkpoints according to an embodiment of the invention. After entry 130 the coordinator sends the "prepare checkpoint" signal as per block 132, wherein all checkpoint threads add the current number of threads in their process to the shared barrier as per block 134. With the barrier now established, each process proceeds to take a single-process, local checkpoint as per block 136. The shared barrier ensures that this is done in a synchronized, memory-consistent way.

Local checkpoints are either saved to disk or to a memory buffer shared with the coordinator. The application processes then send a message to the coordinator, informing it about the location of the checkpoint as depicted in block 138. The coordinator saves the process table at the beginning of its own checkpoint at block 140, then joins (merges) all checkpoints together at block 142 into a single process group checkpoint as a multiprocess checkpoint which is saved by the coordinator at block 144. All threads in the sub-processes are then released from the barrier at block 146 and application execution resumes at block 148.

5.3 Restoring the Process Tree.

Figure 9:
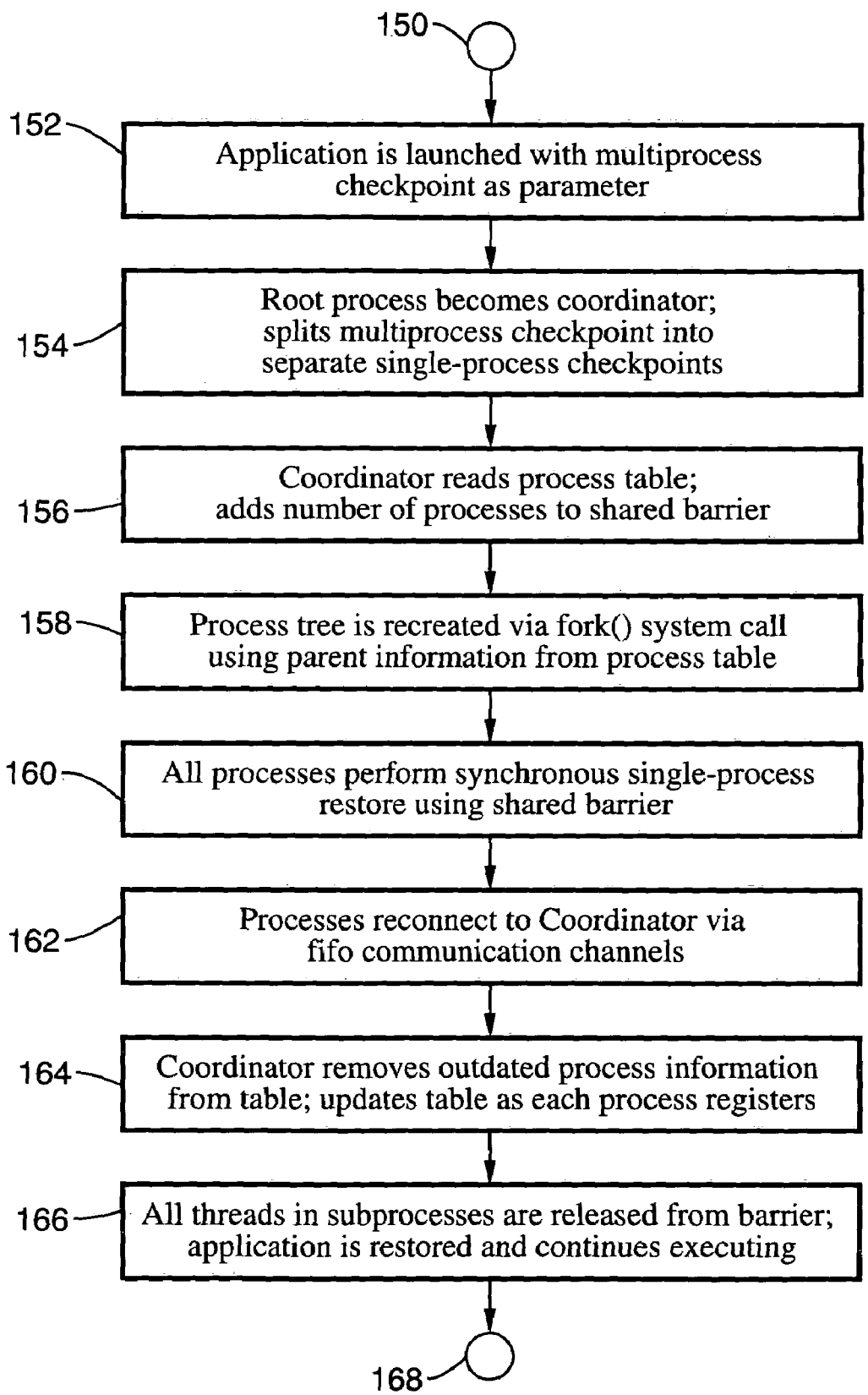
FIG. 9 is a flow diagram illustrating restoration from multiprocess checkpoints according to an aspect/embodiment of the present invention.

FIG. 9 illustrates by way of example embodiment of the invention the restoration of the complete process tree. Entry is made at 150 with the application simply launched in the same manner as before, whereafter the process group checkpoint file is passed as a parameter as represented by block 152. Again, the root process becomes the coordinator as given by block 154. The coordinator opens the joined checkpoint file and uses information at the file header to split the file into separate single-process checkpoints. Next, it reads the process tree information from the checkpoint and adds the number of processes to the shared barrier as per block 156. The coordinator then forks a process tree of the same structure as at the time the checkpoint was taken at block 158, using the parent information included in the process table. From there, the individual processes open their local checkpoint files and performs a memory-map restore similar to the single-process case as per block 160. The shared barrier ensures that this operation is performed synchronously.

After remapping their address spaces, all application processes reconnect to the coordinator as per block 162, which removes the outdated process information from its table as per block 164 and waits for incoming process registration messages. At the end of this phase, the communication setup is identical to the time the checkpoint was taken. Once all FIFOs are reestablished, the restore procedure is over, the barrier is released at block 166, and the application processes can continue 168.

5.4 Fault Detection.

The coordinator can detect the forced disconnection of any application process via the broken FIFO connection. An orderly disconnect from an exiting process includes communicating a disconnect message to the coordinator, so that the coordinator can mark the process as "dead" within its data structure. Only after the coordinator replies to the disconnect request can the application process exit.

If the coordinator detects a forced disconnect through the process FIFOs, it kills all other application processes at once, since it must be assumed that the application is in an inconsistent state, wherein it exits itself so that the application can be restored from the last checkpoint.

6. Checkpoint Kernel Module.

The checkpoint kernel module in the invention is used in conjunction with the checkpointing library for the following tasks:

(a) Saving and restoring the kernel state of a process;

(b) Excluding process state;

(c) Reconnecting the pointers for shared files between parent and children after restore; and (d) Fixing one-end pipes after restore.

According to one aspect of the invention the checkpoint kernel module is implemented as a character device driver with a pseudo-device entry in the file system.

6.1 Device-driver Interface.

A device driver in Linux can be implemented as a loadable kernel module (LKM), which allows the device driver to be loaded or unloaded from the kernel on demand. This is the preferred mechanism for implementing the checkpoint kernel module. The kernel module can be loaded into the kernel via the command "insmod" and unloaded via the command "rmmod".

The kernel module (device driver) interface to the userspace is preferably implemented using a pseudo character device, such as "/dev/etchkptdev". This device can be created for example by using the tool "mkdevnod", which is provided with the kernel module.

According to this embodiment of the present invention, character device interfaces including (1) open, (2) release (i.e., close), (3) read, (4) write, and (5) ioctl (input/output control) are implemented in the checkpoint kernel module.

It will be appreciated that the device needs to be opened before it can be used. During the open call a file descriptor is assigned to the caller by the kernel. According to this embodiment every process using the checkpointing library will have to open this device individually. So, if there are 10 processes being checkpointed, the checkpoint device will be opened 10 times. The same holds when checkpointing an application with multiple processes. As with any other file descriptor, the file descriptor referring to the checkpoint device should be closed after use.

When a read call is issued on the file descriptor referring to the checkpoint device, the invention's kernel module interprets this as a call to read/save process state. When a write call is issued on the file descriptor referring to the checkpoint device, the kernel module interprets this as a call to write/restore process state. Additional details on read and write calls are provided below.

The input/output control (ioctl) call can be issued on the file descriptor referring to the invention's checkpoint device to perform a number of auxiliary operations. The following is a list of these operations, which are described in detail in their appropriate sections:

(a) ET_CPDEV_IOCTL_REG_PROC—to register a process;

(b) ET_CPDEV_IOCTL_UREG_PROC—to unregister a process;

(c) ET_CPDEV_IOCTL_FSHARE—to share a file entry;

(d) ET_CPDEV_IOCTL_FCLOWN—to claim ownership of a file entry;

(e) ET_CPDEV_IOCTL_FREOWN—to reset ownership of a file entry;

(f) ET_CPDEV_IOCTL_FGEOWN—to get ownership of a file entry; and (g) ET_CPDEV_IOCTL_PLUMB—to fix pipes.

6.3 Saving and Restoring Kernel State.

There are components of the state of a process that can only be saved from the kernel space; e.g., the contents of the data buffers of pipes and FIFOs. In addition, some things can be saved more efficiently in the kernel, such as the memory-map state and the file-descriptor state.

As described above, a read call from the invention's kernel module API is used to save the process state. The save buffer is allocated in user space and is passed as an argument to the read call. If the buffer is not big enough to store the process state, the call returns an error (errno=EAGAIN). In such a case a larger buffer is allocated in the user space and the operation is retried. All this buffer management is wrapped into the kernel module API functions. The invention's checkpointing library asks for state information using an API, which internally allocates the buffer and reads the state from the kernel.

The first few bytes in the buffer passed to the kernel contain the identifier of the type of state that should be saved by the kernel. Currently the following two types are defined as (1) File state, (2) Memory-map state. The kernel reads the type information and only returns the specified type of state.

A write call from the invention's kernel module API is used to restore the process state. The restore buffer is created in user space and is passed as an argument to the write call. The buffer management is wrapped into the kernel module API functions. The invention's checkpointing library sets the state using an API, which writes the state to the kernel.

The checkpointing library can save/restore specific state types by using functions provided by the kernel module API, for example it can choose to get the memory-map state independent of the file state.

6.4 Reconnecting File Pointers.

After a fork( ) system call, certain resources are shared between the parent and the child process (e.g., open file descriptors, shared memory segments, semaphores). In the original run of the checkpointed program these resources are still shared because the semantics of fork( ) are maintained. However, after restore these resources are separated because the parent and the child restore their state independently.

Thus, the invention's kernel module is configured to reconstruct the situation that existed at the time of the checkpoint. The parent and child process need to share the same files after restore and their file descriptor entries need to point to the same file table entries. The file table entry is where the properties of the file descriptor are stored, for example information such as file position, owner, and so forth. Accordingly, changes made in the parent should be reflected in the child and vice versa.

The invention's kernel module provides mechanisms for handling these situations. At checkpoint time the processes try to claim ownership of all shared file descriptors one at a time, for example using the kernel module API "chkptdev_door_claim_ownership_of", which internally uses the ioctl ET_CPDEV_IOCTL_FCLOWN. If no other process has yet claimed ownership for a given file descriptor, the kernel makes the calling process the owner of that file descriptor by recording its information, such as process identifier, file descriptor number, and so forth, in the f_owner struct of the file descriptor, which is shared amongst all other references to the same file. The old value in the f_owner structure is returned so that it can be restored later. If another process has already claimed ownership of the file descriptor, the kernel returns the ownership information. This mechanism designates one process in a group of processes sharing the file descriptor as the owner of the file descriptor.

On restore, the owner of the file descriptor opens the file and restores it, while the non-owners share their file pointer with the owner, for example using the kernel module API "chkptdev_door_share_file", which internally uses the ioctl ET_CPDEV_IOCTL_FSHARE. At this time, synchronization is required between processes such that the owner should have finished its operation before the non-owner tries to share. This is achieved in the described embodiment using the above barrier synchronization in the checkpointing library. The kernel module does not care about synchronizing these operations.

After the checkpoint is taken the ownership information is reset using the inventions kernel module API "chkptdev_door_reset_ownership_of", which internally uses the ioctl ET_CPDEV_IOCTL_FREOWN. Ownership information can be obtained using the kernel module API "chkptdev_door_get_ownership_or", which internally uses the ioctl ET_CPDEV_IOCTL_FGEOWN.

6.5 Fixing Pipes.

Typical inter-process communication (IPC) using pipes is implemented in such a way that one of the processes closes the reading end of the pipe, while another closes the writing end of the pipe.

If one process closes one end and the other process closes the other end, then from the perspective of the kernel these are two different files, even though they share the same file system inode. Since the file sharing mechanism (described in the previous section) is implemented at the level of files and not inodes, the processes assume independent ownership of these files, which is not correct because they should point to the same inode.

The file-level sharing in the invention's kernel module would not work in this case because the two ends have their own separate file pointers in the kernel, which are not related except for the inode which both of them share. Therefore, the invention's kernel module fixes pipes to allow sharing at the inode level. The difference between this and the file-sharing approach above is that one cannot use the kernel as the switchboard to claim ownership, because no empty field exists in the inode structure that can be used to mark ownership.

To solve this problem, the shared memory hash table data structure in the checkpointing library was modified to allow use as the switchboard. After claiming ownership at the kernel level, a process tries to enter the inode number in the shared memory hash table. The first process to do so becomes the registered owner of the pipe. The other process, although owner of one of the ends of the pipe, is not a registered owner. At restore time the checkpointing library queries the global hash table for registration information for such pipes. In the present case the registered owner does nothing. The other owner uses the kernel module API "chkptdev_door_plumb", which internally uses the ioctl ET_CPDEV_IOCTL_PLUMB to "plumb" its pipe. During this operation the kernel detaches the current inode from the pipe and attaches the inode for the pipe of the registered owner

6.6 The Kernel Module API.

The invention's kernel module API is implemented in a shared library that hides the usage of the kernel module from the checkpointing library. The checkpointing library calls generic functions for operations and the kernel module API hides the implementation semantics in those wrapper functions.

The kernel module API library opens the checkpoint device in its_init function, which is automatically called when the process starts up. It closes the checkpoint device in its_fini function, which is automatically called when the process is being shut down.

In addition, the library according to the present embodiment of the invention preferably provides the following APIs:

MANUAL INITIALIZATION:
int chkptdev_door_init(void);
MANUAL SHUTDOWN:
int chkptdev_door_exit(void);
GETTING PROCESS STATE:
int chkptdev_door_get process_state(void**pp,
 size_t*psize,
 et_excluded_t*pe);
SETTING PROCESS STATE:
int chkptdev_door_set_process_state(const void*p,
 const size_t size);
FREEING PROCESS STATE:
int chkptdev_door_free_process_state(void*p,
 const size_t size);
PRINTING PROCESS STATE:
int chkptdev_door_print_process_state(const void*p,
 const size_t size);
GETTING PROCESS FILE STATE:
int chkptdev_door_get_process_files_state(void**pp,
 size_t*psize, et_excludedf_t*pe);
SETTING PROCESS FILE STATE:
int chkptdev_door_set_process_files_state(const void*p,
 const size_t size);
FREEING PROCESS FILE STATE:
int chkptdev_door_free_process_files_state(void*p,
 const size_t size);
PRINTING PROCESS FILE STATE:
int chkptdev_door_print_process_files_state(const void*p,
 const size_t size);
GETTING PROCESS MEMORY-MAP STATE:
int chkptdev_door_get_process_memap_state(void**pp,
 size_t*psize, et_excludedm_t*pe);
SETTING PROCESS MEMORY-MAP STATE:
int chkptdev_door_set_process_memap_state(const void*p,
 const size_t size);
FREEING PROCESS MEMORY-MAP STATE:
int chkptdev_door_free_process_memap_state(void*p,
 const size_t size);
PRINTING PROCESS MEMORY-MAP STATE:
int chkptdev_door_print_process_memap_state(const void*p,
 const size_t size);
SHARING A FILE:
int chkptdev_door_share_file(const unsigned int src_fd, const
 pid_t src_pid, const unsigned int dst_fd, const pid_t dst_pid);
CLAIMING OWNERSHIP OF A FILE:
int chkptdev_door_claim_ownership_of(const unsigned int fd,
 const pid_t id, char*pstatus, fown_struct_t*powner);
RESETTING OWNERSHIP OF A FILE:
int chkptdev_door_reset_ownership_of(const unsigned int fd,
 const pid_t id, const fown_struct_t*powner);
GETTING OWNERSHIP OF A FILE:
int chkptdev_door_get_ownership_of(const unsigned
 int fd, fown_struct_t*powner);
FIXING PIPES:
int chkptdev_door_plumb(const unsigned int src_fd, const pid_t
 src_pid, const unsigned int dst_fd, const pid_t dst_pid);

6.7 Device Node Creation Tool.

Once the invention's kernel module of the checkpointing library is loaded, the kernel assigns it a major device number. The device node for the pseudo-device is preferably created using that major number, so that the kernel invokes the checkpoint kernel module if someone opens the checkpoint device. The kernel puts the major number assigned to the checkpoint device driver in the file "/proc/devices". The device node creation tool, called "mkdevnod", reads the major number from there and then uses the system call "mknod( )" to create a pseudo character device with that major number. This approach eliminates the need of having to reserve a major number for the checkpoint device.

7. Storage Checkpointing.

In order to capture a consistent state of an application, it is not generally sufficient to merely obtain memory checkpoints. Consider an example in which an application runs for a period of time and takes several memory checkpoints. As part of application processing it writes data to a file located on a storage device. If at some point the application process crashes, the memory image of the application can be restored to the time of the last checkpoint. However, the output file will reflect the situation right before the crash, which would be inconsistent. In some cases, the inconsistency can be remedied by simply resetting the file pointer to its location at checkpoint time; however, if the file was deleted or copied by the application after the last checkpoint, it cannot be recovered by memory checkpointing alone. A solution to this problem involves storage checkpointing, in which for example the contents of files that an application is using are saved along with the associated memory state.

The invention's storage checkpointing solution presented herein is fully integrated with the memory checkpointing described above. The invention saves and restores the files used by a particular application, in contrast to other solutions that checkpoint whole file systems.

7.1 Taking A Storage Checkpoint.

A couple of conditions are incumbent upon the user in utilizing the invention's storage checkpointing. (1) The user specifies one or more directories that should be protected by storage checkpointing and for each directory, and the user indicates if it is on shared storage. (2) The user specifies a directory for the storage checkpoint which is on a shared file system visible to a backup machine.

The programming according to the present invention is configured to perform a number of aspects in relation to the storage checkpointing. (1a) The programming maintains two checkpoints in memory, including a newer and older checkpoint. (1b) If the specified checkpoint directory is "/home/alpha", one checkpoint is kept in "/home/alpha/previouschkpt" and one copy in "/home/alpha/newchkpt". (1c) The files in the older checkpoint are maintained as copies, whereas the newer checkpoint is made up of file copies and links (described below). (2) A complete copy of the designated directories are saved into the specified storage checkpoint directory, such as "/home/alpha/newchkpt", before starting the application. (3) Storage checkpoints are taken at the time of each memory checkpoint. (4) Before taking a new storage checkpoint the last two storage checkpoints are merged into one, for instance the newer checkpoint is merged into the older checkpoint. (5) An "intention log" is created before the merge process commences to indicate future steps, such as what files are to be merged, whereby problems are avoided if merging is interrupted, because merging can be finished in response to the instructions contained in the intention log prior to a restore. (6) Upon merge completion it is known that at least one valid storage checkpoint is available, and a new checkpoint can be taken. Files in the protected directories are compared with those that were checkpointed last time, such as files in "/home/alpha/previouschkpt". All updated files are copied into the newer storage checkpoint directory, such as "/home/alpha/newchkpt". For all the non-updated files, a link is created by the programming from the newer storage checkpoint to the older storage checkpoint. (7) Files are considered to have been updated when their respective timestamps have been updated (up or down) since the last checkpoint, or if their files size value has changed since the last checkpoint.

7.2 Restoring A Storage Checkpoint.

The method, and programming, according to the present invention is configured for restoring a storage checkpoint. On restoration of a checkpoint, the files in the user-specified directories and those in the newer storage checkpoint directory are compared. It should be appreciated that if the newer storage checkpoint directory is invalid, or empty, then information from the older storage checkpoint directory is utilized. The files that were checkpointed will replace files that have been updated since that checkpoint.

8. Conclusion.

In the embodiments described herein, an example programming environment was described for which an embodiment of programming according to the invention was taught. It should be appreciated that the present invention can be implemented by one of ordinary skill in the art using different program organizations and structures, different data structures, and of course any desired naming conventions without departing from the teachings herein. In addition, the invention can be ported, or otherwise configured for, use across a wide range of operating system environments.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of checkpointing an object, process or other component of an application program, comprising:
    creating at least one incremental checkpoint;
    creating at least one full checkpoint;
    automatically and asynchronously merging at least one said incremental checkpoint and at least one said full checkpoint at a checkpoint storage location;
    wherein incremental checkpointing is implemented in user space;
    wherein said incremental checkpointing comprises page-boundary memory checkpointing; and
    performing file storage checkpointing of one or more files associated with an application program that can be restored without requiring restoration of files for other application programs;
    wherein said file storage checkpointing saves the contents of files that an application program is using and maintains at least a newer and older checkpoint which are merged before creating a new file storage checkpoint.

2. A method as recited in claim 1,
wherein said file storage checkpointing creates an intention log before merging of checkpoints commences; and
wherein merging of newer and older checkpoints can be completed in response to said intention log if merging is interrupted.

3. A method as recited in claim 1, further comprising performing barrier synchronization of incremental and full checkpoints using system semaphores.

4. A method as recited in claim 1, wherein checkpointing is carried out within a device driver, whereby operating system kernel modification is not required.

5. A method as recited in claim 1, further comprising capturing the state of waiting queues using kernel-level interception of system calls.

6. A method as recited in claim 5, wherein said interception is implemented in a kernel module in a multiprocessing environment or in a single processing environment.

7. A method as recited in claim 1, further comprising capturing the state of inter-process communication via pipes, FIFOs, and sockets using a device driver, whereby operating system kernel modification is not required.

8. A method as recited in claim 1, further comprising capturing process memory map state within a device driver, whereby operating system kernel modification is not required.

9. A method as recited in claim 1, further comprising reconnecting kernel pointers for shared files between parent and child processes after restoring from a checkpoint within a device driver, whereby operating system kernel modification is not required.

10. A method as recited claim 7, 8 or 9, wherein said device driver is implemented as a loadable kernel module in a multiprocessing environment or in a single processing environment.

11. A method as recited in claim 1:
wherein said file storage checkpointing is configured to fix pipes to allow sharing at an inode level;
wherein file-level sharing is prevented from having two ends with their own separate file pointers which are not related except for the inode which both of them share.

12. A method as recited in claim 11, wherein fixing pipes comprises:
maintaining a shared memory hash table configured to allow use as a switchboard; and
registering the first process claiming ownership by attempting to enter the inode number in the shared memory hash table as a registered owner of the pipe;
wherein other processes, although owner of one end of the pipe are not a registered owner of the pipe, and during restore time the inode from the pipe is detached and the inode is attached for the pipe of the registered owner.

13. A method as recited in claim 1, wherein said file storage checkpointing is configured to compare, on storage checkpoint restoration, the files in the user-specified directories with those in the newer storage checkpoint directory so that the user file is not restored to an invalid or empty file.

14. A computer readable medium with computer readable rprogram code stored thereon, said computer readable program code configured to, when executed by a computer, carry out the steps comprising:
performing page boundary incremental checkpointing with automatic asynchronous merging of checkpoints at the checkpoint storage location;
performing file storage checkpointing of one or more files associated with an application program that can be restored without requiring restoration of files for other application programs;
wherein said file storage checkpointing saves the contents of files that an application program is using and maintains at least a newer and older checkpoint which are merged before creating a new storage checkpoint;
wherein said page boundary incremental checkpointing and said file storage checkpointing run entirely in user space; and
wherein kernel modification is not required for implementation of said page boundary incremental checkpointing or said file storage checkpointing.

15. A computer readable medium as recited in claim 14, wherein said computer readable code performs the steps further comprising:
wherein said file storage checkpointing is configured to create an intention log before the merge process commences that allows merging of newer and older checkpoints to be completed in response to the intention log if merging is interrupted.

16. A computer readable medium as recited in claim 14, wherein said computer readable code performs the steps further comprising performing barrier synchronization using system semaphores.

17. A computer readable medium as recited in claim 14, wherein said computer readable code performs the steps further comprising capturing the state of waiting queues using kernel-level interception of system calls.

18. A computer readable medium as recited in claim 17, wherein said interception is implemented in a kernel module in a multiprocessing environment.

19. A computer readable medium as recited in claim 15, wherein said computer readable code performs the steps further comprising capturing the state of inter-process communication via pipes, FIFOs, and sockets using a device driver, whereby operating system kernel modification is not required.

20. A computer readable medium as recited in claim 14, wherein said computer readable code performs the steps further comprising capturing process memory map state using a device driver, whereby operating system kernel modification is not required.

21. A computer readable medium as recited in claim 14, further comprising reconnecting kernel pointers for shared files between parent and child processes after restoring from a checkpoint using a device driver, whereby operating system kernel modification is not required.

22. A computer readable medium as recited in claim 19, 20 or 21, wherein said device driver is implemented as a loadable kernel module in a multiprocessing environment or in a single processing environment.

23. A computer readable medium as recited in 14, wherein said computer readable program code is configured to carry out the steps further comprising:
capturing the state of inter-process communication via pipes; and
fixing pipes to allow sharing at an inode level in response to said file storage checkpointing;
wherein file-level sharing is prevented from having two ends with their own separate file pointers which are not related except for the inode which both of them share.

24. A computer readable medium as recited in claim 23, wherein said fixing pipes comprises:
maintaining a shared memory hash table configured to allow use as a switchboard; and registering the first process claiming ownership by attempting to enter the inode number in the shared memory hash table as a registered owner of the pipe;

wherein other processes, although owner of one end of the pipe are not a registered owner of the pipe, and during restore time the inode from the pipe is detached and the inode is attached for the pipe of the registered owner.

25. A computer readable medium as recited in claim 14, wherein said file storage checkpointing is configured to compare, on storage checkpoint restoration, the files in the user-specified directories with those in the newer storage checkpoint directory so that the user file is not restored to an invalid or empty file.

26. A checkpointing method in a computer system, comprising:

checkpointing memory images of processes and data for restoration of an entire process tree/hierarchy or for restoration of only the first or second level of the process tree/hierarchy;

wherein one or more portions of said process tree/hierarchy are restorable based on priority of application programs or processes.

27. A method as recited in claim 26, wherein said processes are multi-threaded.

28. A method as recited in claim 26, wherein said processes are non-multithreaded.

29. A method as recited in claim 26, further comprising:

holding multiple processes of said process tree/hierarchy and associated threads within a barrier for multiple processes in a given application program;

wherein said barrier is controlled by a data structure containing information on identification of semaphore, processes in the group, number of processes that have entered thread information, number of threads, and number of threads waiting at the barrier.

30. A method as recited in claim 26, further comprising capturing the state of waiting queues using kernel-level interception of system calls.

31. A method as recited in claim 30, wherein said interception is implemented in a kernel module in a multiprocessing environment.

32. A method as recited in claim 26, further comprising capturing the state of inter-process communication via pipes, FIFOs, and sockets using a device driver, whereby operating system kernel modification is not required.

33. A method as recited in claim 26, further comprising capturing process memory map state using a device driver, whereby operating system kernel modification is not required.

34. A method as recited in claim 26, further comprising reconnecting the kernel pointers for shared files between parent and child processes after restoring from a checkpoint using a device driver, whereby operating system kernel modification is not required.

35. A method as recited in any of claims 32, 33 or 34, wherein said device driver is implemented as a loadable kernel module in a multiprocessing environment or in a single processing environment.

36. A method as recited in claim 26:

wherein said file storage checkpointing is configured to fix pipes to allow sharing at an inode level;

wherein file-level sharing is prevented from having two ends with their own separate file pointers which are not related except for the inode which both of them share.

37. A method as recited in claim 36, wherein fixing pipes comprises:

maintaining a shared memory hash table configured to allow use as a switchboard; and registering the first process claiming ownership by attempting to enter the inode number in the shared memory hash table as a registered owner of the pipe;

wherein other processes, although owner of one end of the pipe are not a registered owner of the pipe, and during restore time the inode from the pipe is detached and the inode is attached for the pipe of the registered owner.

38. A method as recited in claim 26, wherein said file storage checkpointing is configured to compare, on storage checkpoint restoration, the files in the user-specified directories with those in the newer storage checkpoint directory so that the user file is not restored to an invalid or empty file.

39. A computer readable medium with computer readable program code stored thereon, said computer readable program code configured to, when executed by a computer, carry out the steps comprising:

checkpointing memory images of processes and data for restoration of an entire process tree/hierarchy;

wherein one or more portions of said process tree/hierarchy are restorable based on priority of application programs or processes.

40. A computer readable medium as recited in claim 39, wherein said processes are multi-threaded.

41. A computer readable medium as recited in claim 39, wherein said processes are non-multithreaded.

42. A computer readable medium as recited in claim 39, further comprising holding multiple processes of said process tree/hierarchy and associated threads within a barrier for multiple processes in a given application.

43. A computer readable medium as recited in claim 39, wherein said computer program performs the steps further comprising capturing the state of waiting queues using kernel-level interception of system calls.

44. A computer readable medium as recited in claim 43, wherein said interception is implemented in a kernel module in a multiprocessing environment.

45. A computer readable medium as recited in claim 39, further comprising capturing the state of inter-process communication via pipes, FIFOs, and sockets using a device driver, whereby operating system kernel modification is not required.

46. A computer readable medium as recited in claim 39, further comprising capturing process memory map state using a device driver, whereby operating system kernel modification is not required.

47. A computer readable medium as recited in claim 39, further comprising reconnecting kernel pointers for shared files between parent and child processes after restoring from a checkpoint using a device driver, whereby operating system kernel modification is not required.

48. A computer readable medium as recited in claim 45, 46 or 47, wherein said device driver is implemented as a loadable kernel module in a multiprocessing environment or in a single processing environment.

49. A checkpointing method in a computer system, comprising:

checkpointing user-space application memory images and the state that the operating system maintains on behalf of the application; and performing file storage checkpointing of one or more files associated with an application program that can be restored without requiring restoration of files for other application programs;

wherein said file storage checkpointing saves the contents of files that an application program is using and maintains at least a newer and older checkpoint which are merged before taking a new storage checkpoint.

50. A method as recited in claim 49, further comprising capturing the state of waiting queues using kernel-level interception of system calls.

51. A method as recited in claim 50, wherein said interception is implemented in a kernel module in a multiprocessing environment.

52. A method as recited in claim 49, further comprising capturing the state of inter-process communication via pipes, FIFOs, and sockets using a device driver, whereby operating system kernel modification is not required.

53. A method as recited in claim 49, further comprising capturing process memory map state using a device driver, whereby operating system kernel modification is not required.

54. A method as recited in claim 49, further comprising reconnecting kernel pointers for shared files between parent and child processes after restoring from a checkpoint using a device driver, whereby operating system kernel modification is not required.

55. A method as recited in claim 52, 53 or 54, wherein said device driver is implemented as a loadable kernel module in a multiprocessing environment or in a single processing environment.

56. A method as recited in claim 49, wherein said file storage checkpointing is configured to create an intention log before the merge process commences that allows merging of newer and older checkpoints to be completed in response to the intention log if merging is interrupted.

57. A method as recited in claim 49:
wherein said file storage checkpointing is configured to fix pipes to allow sharing at an inode level; and
wherein file-level sharing is prevented from having two ends with their own separate file pointers which are not related except for the inode which both of them share.

58. A method as recited in claim 57, wherein fixing pipes comprises:
maintaining a shared memory hash table configured to allow use as a switchboard; and
registering the first process claiming ownership by attempting to enter the inode number in the shared memory hash table as a registered owner of the pipe;
wherein other processes, although owner of one end of the pipe are not a registered owner of the pipe, and during restore time the inode from the pipe is detached and the inode is attached for the pipe of the registered owner.

59. A method as recited in claim 49, wherein said file storage checkpointing is configured to compare, on storage checkpoint restoration, the files in the user-specified directories with those in the newer storage checkpoint directory so that the user file is not restored to an invalid or empty file.

60. A computer readable medium with computer readable program code stored thereon, said computer readable program code configured to, when executed by a computer, carry out the steps comprising:
checkpointing user-space application memory images and the state that the operating system maintains on behalf of the application; and
perform file storage checkpointing of one or more files associated with an application program that can be restored without requiring restoration of files for other application programs;
wherein said file storage checkpointing saves the contents of files that an application program is using and maintains at least a newer and older checkpoint which are merged before taking a new storage checkpoint.

61. A computer readable medium as recited in claim 60, wherein said file storage checkpointing is configured to create an intention log before the merge process commences that allows merging of newer and older checkpoints to be completed in response to the intention log if merging is interrupted.

62. A computer readable medium as recited in claim 60:
wherein said file storage checkpointing is configured to fix pipes to allow sharing at an inode level;
wherein file-level sharing is prevented from having two ends with their own separate file pointers which are not related except for the inode which both of them share.

63. A computer readable medium as recited in claim 62, wherein said fixing pipes comprises:
maintaining a shared memory hash table configured to allow use as a switchboard; and
registering the first process claiming ownership by attempting to enter the inode number in the shared memory hash table as a registered owner of the pipe;
wherein other processes, although owner of one end of the pipe are not a registered owner of the pipe, and during restore time the inode from the pipe is detached and the inode is attached for the pipe of the registered owner.

64. A computer readable medium as recited in claim 60, wherein said file storage checkpointing is configured to compare, on storage checkpoint restoration, the files in the user-specified directories with those in the newer storage checkpoint directory so that the user file is not restored to an invalid or empty file.

65. A method of checkpointing an object, comprising:
checkpointing user-space application memory images and the state that the operating system maintains on behalf of the application;
providing file storage checkpointing of the contents of files that an application program is using that can be restored without requiring restoration of files that other application programs are using;
providing a link to a saved first file storage checkpoint;
maintaining the link to the first file storage checkpoint when a second file storage checkpoint is saved;
merging first and second file storage checkpoints before taking a new storage checkpoint; and
creating an intention log for said file storage checkpointing before the merging process commences that allows merge completion of first and second file checkpoints based on the intention log if merging is interrupted.

66. A method as recited in claim 1, 26 or 49, further comprising:
providing means for saving N full copies of file storage checkpoints;
providing a hard link to a first saved file storage checkpoint; and
removing the first file storage checkpoint when a subsequent file storage checkpoint is saved and maintaining the hard link to the first saved file storage checkpoint;
wherein a physical copy of said first file storage checkpoint is not made when said subsequent file storage checkpoint is saved.

67. A method as recited in claim 66, further comprising:
synchronizing a storage image with a memory image at the time a checkpoint is saved;
wherein each memory checkpoint has a corresponding file storage checkpoint.

68. A method as recited in claim 66, further comprising:
synchronizing a storage image with a memory image at the time a checkpoint is saved;

wherein each memory checkpoint has a corresponding storage checkpoint.

69. A computer readable medium as recited in claim 14, 39 or 60, wherein said computer readable program code is configured to carry out the steps further comprising:
providing file storage checkpointing;
saving N full copies of file storage checkpoints;
providing a hard link to a first saved file storage checkpoint; and
removing the first storage checkpoint when a subsequent file storage checkpoint is saved and maintaining the hard link to the first saved file storage checkpoint;
wherein a physical copy of said first file storage checkpoint is not made when said subsequent file storage checkpoint is saved.

70. A method as recited in claim 1 or 49, further comprising:
providing a template which defines one or more processes to be protected by checkpointing and which provides for selective restoration.

71. A computer readable medium as recited in claim 14, 39 or 60, wherein said computer readable program code is configured to carry out the steps further comprising:
maintaining a template which defines one or more processes to be protected by said checkpointing and which provides for selective restoration; and accessing said template.

\* \* \* \* \*